United States Patent [19]

Perkins et al.

[11] 4,093,351

[45] June 6, 1978

[54] CONTROLLED FLEXIBLE MEMBRANE REFLECTOR

[76] Inventors: Charles W. Perkins, 5256 James Rd., Santa Barbara, Calif. 93111; Gerhard Rohringer, 745 Winding Creek La., Santa Barbara, Calif. 93108

[21] Appl. No.: 667,169

[22] Filed: Mar. 15, 1976

[51] Int. Cl.² .............................................. G02B 5/10
[52] U.S. Cl. ..................................... 350/310; 350/295
[58] Field of Search ................. 350/295, 310; 343/915

[56] References Cited

U.S. PATENT DOCUMENTS

| | | | |
|---|---|---|---|
| 2,403,915 | 7/1946 | Evans | 350/295 |
| 3,031,928 | 5/1962 | Kopito | 350/295 |
| 3,261,016 | 7/1966 | Burr | 350/310 X |
| 3,322,483 | 5/1967 | Jones | 350/295 |
| 3,514,776 | 5/1970 | Mulready | 350/295 X |
| 3,574,447 | 4/1971 | Ruble | 350/295 X |
| 3,623,793 | 11/1971 | Merten et al. | 350/295 |
| 3,659,930 | 5/1972 | Groneberg et al. | 350/295 X |
| 3,742,234 | 6/1973 | Laakmann | 350/295 X |
| 3,893,755 | 7/1975 | Coberg et al. | 350/295 |
| 3,904,274 | 9/1975 | Feinleeb et al. | 350/295 X |

FOREIGN PATENT DOCUMENTS

| | | | |
|---|---|---|---|
| 380,473 | 9/1932 | United Kingdom | 350/295 |

OTHER PUBLICATIONS

Optical Scanning Using Electrically-Modulated Membrane Mirrors, Semi-Annual Technical Report No. 2, Final Report, Jan. 1962-Dec. 1962, Irco Corporation, New York, N. Y., Reproduced by the Armed Services Technical Information Agency, Arlington Hall Station, Arlington 12, Virginia 1963, pp. 1-49, 71,73, 101, 104, 110.

Morrison: S.P.I.E. Journal, vol. 8, No. 4, Apr.-May 1970, pp. 107-118.

Muller: Journal of the Optical Society of America, vol. 64, No. 9, Sep. 1974, pp. 1200-1210.

Primary Examiner—F. L. Evans
Attorney, Agent, or Firm—Finnegan, Henderson, Farabow & Garrett

[57] ABSTRACT

The embodiments of the disclosed controlled flexible membrane reflector show a system wherein the optical surface of a reflector is electrostatically controlled. By controlling the electric field acting on selected portions of the flexible membrane which bears the optical surface, the shape of the optical surface can by dynamically controlled. A figure sensor or image quality detector detects deviations of the reflecting surface of the membrane from the desired figure and a feedback control system adjusts selected portions of the electric field to return the reflective surface to its proper figure. The differential control of the electric field is accomplished by segmenting a back electrode and controlling the voltage on each segment individually. The control voltage varies around a nominal value applied to all segments which is required to deflect the surface into its desired shape.

13 Claims, 4 Drawing Figures

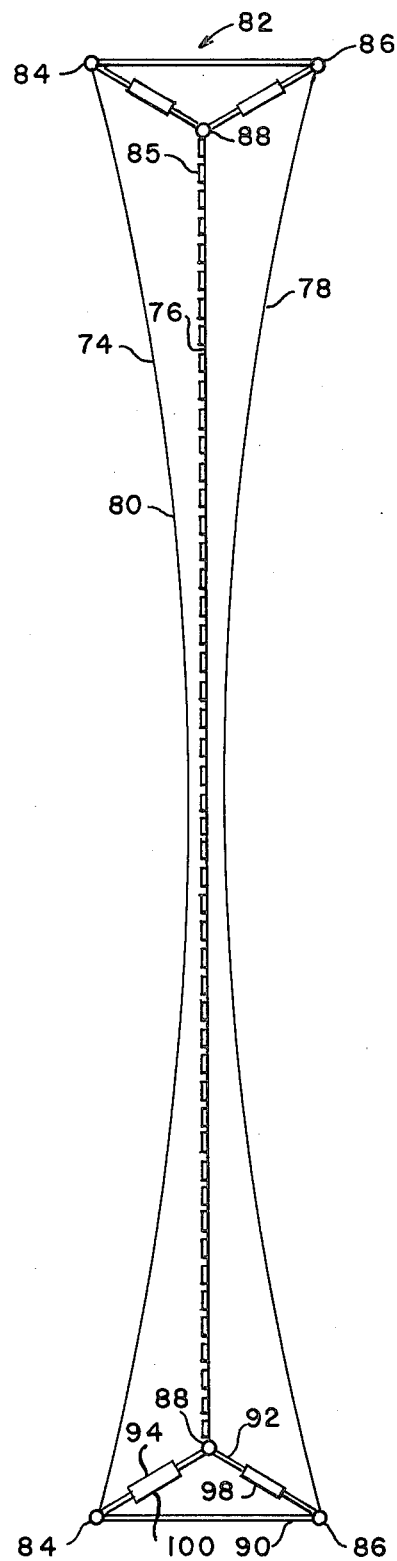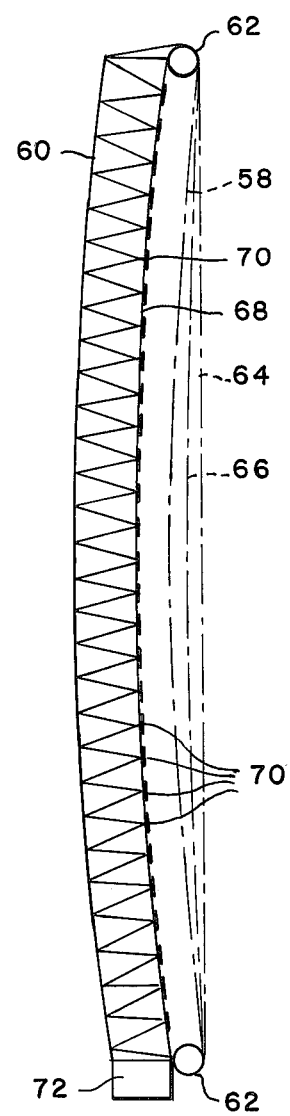
Fig. 3
Fig. 2

CONTROLLED FLEXIBLE MEMBRANE REFLECTOR

BACKGROUND OF THE INVENTION

The present invention is related to a flexible thin membrane reflector such as can be used for telescopes or radiation antennas. The thin membrane reflector of this invention can be built for lower cost and less weight than reflectors of traditional design with glass mirror surfaces for instance and additionally is particularly adaptable to active figure control Thin membrane reflectors which are electrostatically controlled are known in the prior art. The concept of deforming a thin membrane into a curved reflecting surface by using electrostatic forces is old. One reflector taught in the prior art includes an electrode co-extensive in area with the free portion of a membrane and spaced in parallel relation to the membrane such that nearly a uniform attraction is exerted on the membrane. When a control voltage is applied, the membrane is deflected to a substantially spherical surface. Other than spherical surfaces can be obtained in this reflector system by choosing or selecting electrodes of different shapes, choosing different spacings or changing the control voltage.

However, a disadvantage of the thin membrane reflectors found in the prior art is the difficulty in dynamically controlling portions of the optical surface as they may deviate from the desired optical figure. In the thin membrane reflectors found in the prior art a single integral electrode is used to establish the electrostatic field which deflects the membrane. Consequently, control over selected portions of the membrane is not possible.

SUMMARY OF THE INVENTION

The present invention overcomes the problems of the prior art by providing a flexible controlled membrane reflector which utilizes active figure control. Considered in its broadest aspects, the controlled flexible membrane reflector comprises a flexible conductive membrane having an optical surface which is mounted on a supporting structure and is positioned in an electric field which deflects the membrane into a generally desired shape. Selected portions of the membrane are altered in shape by varying selected corresponding portions of the electric field.

In accordance with the purposes of the invention as embodied and broadly described herein, the controlled flexible membrane reflector of this invention comprises a flexible conductive membrane with an optical surface, a supporting structure including a rim on which the membrane is mounted, and an electric field operative on the membrane to generally shape the optical surface of the membrane into the desired shape and means for controlling the electric field to deflect selected portions of the optical surface which have deviated from design. The means for controlling the electric field preferably includes a figure sensor which senses deviations of the reflecting optical surface of the membrane from the desired figure or an image sensor which detects changes in the image. By feeding back control signals functionally related to deviations in the surface or image quality, control voltages are applied to electrostatic control elements of the electrode corresponding to those surface portions which deviate from the desired shape.

Preferably a control electrode is provided which is segmented into a plurality of electrostatic control elements which are electrically insulated one from another and each of which is connected to a potential source which provides a control voltage thereto.

It is also preferred that all the elements are connected to some nominal voltage which is sufficient to statically deflect the membrane into its initial shape, nominally the desired shape. Both the nominal and control voltage supplies can be direct current devices or alternating current devices providing the frequency of the nominal alternating current is considerably above the mechanical frequencies of the membrane and its supporting structure.

It is also preferred that the control of the shape of the optical surface is achieved by use of a figure sensor for sensing the optical surface or an image quality sensor for sensing the effects of the surface on the image and a processor responsive to the output of the sensor which is connected to a plurality of control voltage sources applied to the respective electrostatic control elements of the electrode.

BRIEF DESCRIPTION OF THE DRAWINGS

In the drawings

FIG. 2 is a cross section view of an electrostatically controlled single membrane reflector of this invention;

FIG. 3 is a cross section view of an electrostatically controlled double membrane reflector of this invention.

DESCRPTION OF THE PREFERRED EMBODIMENT

Reference will now be made in detail to the preferred embodiments of the invention, examples of which are illustrated in the accompanying drawings. As used herein it is understood that optical includes R.F. signals.

Figure 1:
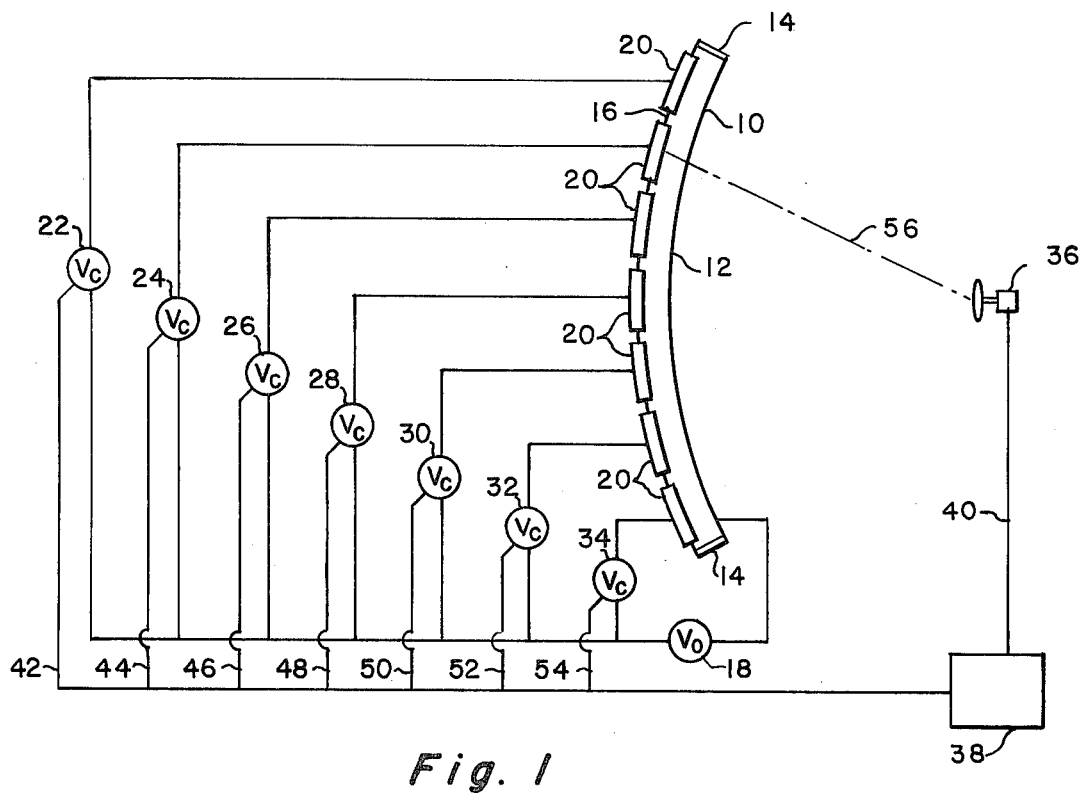
FIG. 1 is a schematic diagram of a preferred embodiment of the controlled membrane reflector of this invention.

Referring first to FIG. 1 it may be seen that the reflector includes a flexible thin membrane 10 having an optical surface 12. In accordance with the invention, the flexible conductive membrane 10 is mounted on a supporting structure 14. Exemplary materials which can be used for the flexible membrane 10 are polyester film sold under the Dupont trademark Mylar type D, metal foil, polyethylene, composites such as carbon-fiber-backed Polyester film and a carbon matrix.

Preferably a backplate electrode structure 16 is spaced from the flexible membrane 10 so that a nominal voltage $V_o$ applied to electrode structure 16 can statically position the membrane to a desired design shape.

As here embodied there is developed an electric field operative on the flexible membrane 10 such that the optical surface 12 is deflected generally to a concave shape by the electric field when a potential is applied across the space between backplate electrode structure 16 and membrane 10. Preferably a voltage source 18 applies a nominal voltage $V_o$ between the flexible membrane 10 and the backplate electrode structure 16 which establishes the electric field thereby placing the necessary tension on the membrane 10 to deflect it to its desired shape such as the spherical concave shape as shown. It will be understood, however, that the achievable surface shapes are not restricted to the spherical concave shape shown but include other desirable optical surfaces such as axii-symmetric parabolas of revolution, essentially flat surfaces, convex surfaces, multi-curved surfaces (i.e., concave and convex), surfaces with holes, and segments of surfaces as utilized in off-axis optical designs. The control system and the shape of the segmented back electrode must be designed appropriately for these alternative designs.

It is preferred that the back plate electrode 16 be comprised of a plurality of electrostatic control elements 20. Each control element 20 is connected to a control voltage source so that control voltages $V_c$ can be applied to selected control elements 20 and in effect be superimposed on the voltage $V_o$ of source 18. By control of the voltage sources 22–34 localized deflection of the surface 12 of the flexible membrane 10 can be achieved in a dynamic situation. The feedback control also compensates for surface malformities (e.g., non-isotropic materials) and for distortions of the membrane support structure (e.g., thermal distortions) and control electrode misplacement.

As here embodied means for controlling selected portions of the electric field includes sensor 36 and processor unit 38 connected by line 40. As shown sensor 36 is on axis but can be located in other positions relative to the surface 12 membrane 10. Processor unit 38 is connected in turn to each of the control voltage sources 22–34 by lines 42–54 respectively. The sensor 36 can be a figure sensor which can accurately measure distances to the surface 12 of membrane 10 to detect deviations from the design shape or surface figure. Signals indicative of surface deviations from design are transmitted to the processor 38 from the sensor 36.

The sensor shown in FIG. 1, if a figure sensor, measures the distance from the sensor to any point on the surface 12 of membrane 10 as by the transmission of a monochromatic light beam 56. Typically a laser range finder or multipoint interferometer can be used as a figure sensor.

An alternative device useable as a sensor 36 measures the quality of the image produced by the surface 12 at the focal plane of the optical system. An indication of a deviation from the desired quality of a portion of the image can be processed through processor unit 38 to the control voltage sources 22–34. A change in the control voltage applied to one or more selected control elements 20 effects a change in the optical surface 12 and restores the image quality. See "Real Time Correction of Atmospherically Degraded Telescope Images Through Image Sharpening," Richard A. Muller and Andrew Buffington, Journal of the Optical Society of America Vol. 64, No. 9 Sept. 1974 which describes such an image sensor.

Still referring to FIG. 1, the membrane 10 may be pre-formed to an approximation of the final shape when a low f-number is desired rather than attempting to deflect a planar flat membrane entirely by the electrostatic field. It will be recognized that the lower the f-number desired for the optical surface 12, the greater the curvature.

An exemplary design according to the invention and with particular reference to the schematic drawing in FIG. 1 includes a reflector having a 30 meter useful aperture. For such a reflector the rim diameter of structure 14 is chosen at 31 meters thereby allowing for a small portion of the controlled membrane surface to be used to eliminate deformations in the membrane 10 caused by the rim 14. A typical f-number of two (2) can be chosen for the surface 12 of the reflector assembly.

The spacing between the back electrode plate 16 and the membrane 10, when the membrane 10 is in its operating position, should be such as to permit use of a single nominal voltage $V_o$ applied from source 18 to statically position the membrane 10. In this example and to insure electrical stability of the control system, the spacing is twice the membrane deflection or a one meter separation between membrane 10 and back electrode plate 16. Under these circumstances the nominal voltage to be applied across the membrane 10 and back electrode plate 16 to tension a one mil membrane to a 50 centimeter deflection is 400,000 volts. It is to be noted, however, that there is virtually no power demand.

Finally in the exemplary design, a large number of electrostatic control elements 20, perhaps numbering in the thousands would be required to provide the localized control required to adjust for deviations from the desired surface figure of membrane 10.

Referring now to FIG. 2, a preferred structure for supporting the electrode back plate 60 and membrane 58 is shown in cross-section. As here embodied a flexible membrane 58 is drawn toward the rigid back structure 60 which includes outer rim 62 causing the surface of membrane 58 to be placed under tension and thus stiffened. Preferably the membrane 58 is attached to the toroidal insulating rim 62. For purposes of comparision a planar position of the membrane is shown by center line 64 while the untensioned membrane position, assuming a pre-formed membrane, is shown by dotted line 66.

Preferably the supporting structure 60 is a truss which provides support to both the back electrode mounting plate 68 and includes the insulating rim 62 upon which flexible member 58 is mounted.

As here embodied and shown in FIG. 2 the back electrode mounting plate 68 has mounted thereon a plurality of electrostatic control elements 70. Although not explicitly shown in FIG. 2 it is to be understood that the control system and various voltage sources as depicted in FIG. 2 also would be connected in a fashion similar to the reflector system shown in FIG. 1.

Preferably the supporting structure 60 also provides an enclosure for the control electronics and the high voltage supply required to control the deflection of the membrane 58. Such electronics can be contained in the compartment 72.

The support system shown in FIG. 2 utilizes the stiffness of the truss to hold the electrode mounting plate 68 in place and results in a simplified control system, although the total structure is made heavier in weight because of the truss 60.

Referring now to FIG. 3 a second preferred structure is shown for mounting a flexible membrane. As here embodied three membranes 74, 76, and 78 are used to provide the support structure for the reflector system. Flexible thin membrane 74 having an optical surface 80 is mounted on a rim structure 82 as discussed before, so that it is deflected by an electrostatic field to conform to the desired surface figure. A second, compensating thin membrane 78, is also mounted on the rim structure 82 to provide balancing structural forces holding the total reflector assembly in a correct orientation. The third central membrane 76 is mountd in a sandwiched central position between the first two membranes 74 and 78 and provides support for a plurality of electrostatic control elements 85. These electrostatic control elements 85 can be etched on the membrane 76 or otherwise mounted thereon. Alternatively the central membrane 76 could be embodied as a stiffened floor by increasing its thickness.

As here embodied and shown in FIG. 3 an essential aspect of the support structure is the particular configuration of the rim structure 82 allowing for expansion of the rim. Recognizing that the rim structure 82 is cylindrical in shape, FIG. 3 showing the rim in a diametrical cross-section, members 84, 86 and 88 are shaped like hoops and interconected by a strut structure including members 90, 92, and 94. Preferably a plurality of such strut like members 92, 94 and 90 are spaced around the perimeter of the reflector assembly so as to give rigidness and stiffness to the rim structure 82.

Preferably struts 92 and 94 have built into them servo actuators 98 and 100 which are used to correct rim malformities and to adequately tension the central membrane 76. The servo actuators can be built based on hydraulic or mechanical principles with proper control responsive to the tension on membrane 76.

As here embodied it will be seen that the hoop elements 84 and 86 can expand or contract due to the forces placed upon each through the servo actuators 98 and 100. The number and placement of struts such as 92, 94 and 96 and the servo actuators 98 and 100 is determined by good engineering practice dependent on the total size of the reflector, the forces exerted upon the membrane, and other engineering considerations.

In operation it is to be understood that the embodiment shown in FIG. 3 is connected to a control system which includes the appropriate figure sensor, processor unit, and voltage sources as in the system of FIG. 1. In operation the membranes 74 and 78 are attracted toward the middle membrane 76 by the electric fields applied respectively between the membranes 74 and 76 and the membranes 76 and 78. Since the thin flexible membrane 74 having the optical surface 80 and the compensating membrane 78 are each attracted with equal force to the mid-plane 76 (the nominal voltage $V_o$ is applied with the same polarity to the membranes 74 and 78 respectively), the forces on rim structure should be substantially equal and opposite. Alternatively the compensating membrane 78 could be controlled separately by a second set of control electrodes similar to but isolated from the segments 85.

As embodied in FIG. 3, the total reflector assembly has the advantage of being extremely light weight. By utilizing the compensating membrane concept, it is possible to eliminate substantial weight normally required by a truss structure. Another advantage is a simple manufacturing process since the curved optical surface is produced with a planar control electrode surface.

Figure 4:
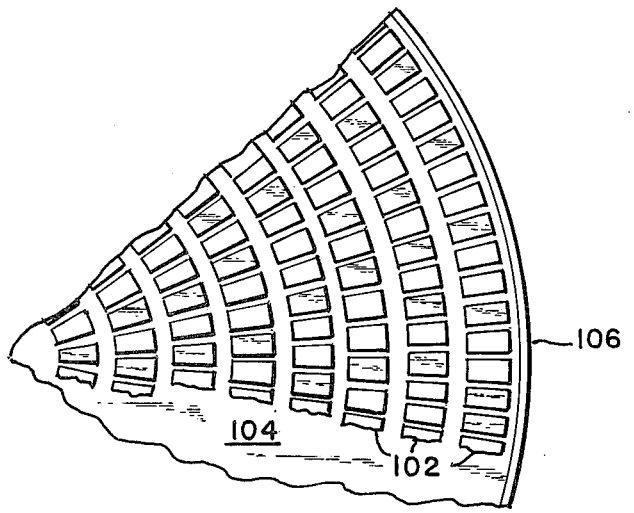
FIG. 4 is a sectional plan view of one configuration of the electrostatic controlled elements of the electrode for either embodiment shown in FIGS. 2 and 3.

Referring now to FIG. 4 an exemplary configuration of the electorstatic control elements 102 is shown in a plan view of the back plate assembly of the reflector of this invention. The configuration of electrostatic control elements 102 shown in FIG. 4 can be used with each of the previous embodiments discussed above.

As shown in FIG. 4 the electrostatic control elements 102 are mounted on a back plate 104 in a radial fashion extending from the center of back plate 104 to the rim 106. Each element 102 must be insulated from the adjacent elements; however, for localized control of the field, the elements must be physically close together without being so close as to risk an electrical break down between elements. As shown in FIG. 4 the elements 102 are of the same surface area whether at the center or the perimeter of the reflector assembly. Other possible configurations of the control elements 102 can be used for particular requirments of surface figure.

What is claimed is:

1. A controlled flexible membrane reflector comprising:
   a flexible conductive membrane with an optical surface;
   a supporting structure on which said membrane is mounted;
   means for providing an electric field operative on said flexible membrane, said optical surface of said flexible conductive membrane being shaped by said electric field;
   a sensor for continuously detecting the shape of said optical surface of said flexible membrane; and
   means responsive to said sensor for controlling selected portions of said electric field for altering the shape of corresponding selected portions of said optical surface to counteract passive and dynamic perturbations in said surface.

2. The controlled flexible membrane reflector of claim 1 wherein said means for providing an electric field includes a backplate electrode structure set apart from and adjacent to the flexible membrane on the side opposite the optical surface, said backplate electrode structure being made up of a plurality of electrostatic control elements electrically insulated one from another, each said control element being adapted to be connected to a control voltage.

3. The controlled flexible membrane reflector of claim 1 wherein said means for controlling selected portions of said electric field includes a processor responsive to the output of said sensor and a plurality of control voltage sources connected to respective electrostatic control elements for applying signals thereto responsive to the output of said processor.

4. The controlled flexible membrane reflector of claim 1 wherein said supporting structure includes a rim structure, a compensating membrane mounted on said rim structure opposite said flexible conductive membrane and a central membrane located between said conductive membrane and said compensating membrane attached to said rim structure.

5. The controlled flexible membrane reflector of claim 4 wherein said means for controlling selected portions of said electric field includes a plurality of electrostatic control elements mounted on said central membrane respectively adapted to be connected to a control voltage source.

6. The controlled flexible membrane reflector of claim 5 wherein each said electrostatic control element is of the same surface area.

7. The controlled flexible membrane reflector of claim 1 wherein said supporting structure includes a truss and outer rim, said flexible conductive membrane being mounted to said rim and the surface of said membrane includes a portion for eliminating deformations caused by mounting to said supporting structure and an optical surface portion.

8. The controlled flexible membrane reflector of claim 7 wherein said means for controlling said electric field includes a back electrode mounting plate supported by said truss and a plurality f electrostatic control elements respectively adapted to be connected to a control voltage mounted on said back electrode mounting plate.

9. The controlled flexible membrane reflector of claim 8 wherein each said electrostatic control element is of the same surface area.

10. The controlled flexible membrane reflector of claim 1 wherein said flexible conductive membrane is preformed to achieve a given stress pattern after tensioning for a particular optical shape.

11. The controlled flexible membrane reflector of claim 7 wherein said portion for eliminating deformations is adjacent said outer rim and said optical surface portion is surrounded by said portion for eliminating deformations.

12. A controlled flexible membrane reflector comprising:
   a flexible conductive membrane with an optical surface;
   a supporting structure on which said membrane is mounted;
   means for providing an electric field operative on said flexible membrane, said optical surface of said flexible conductive membrane being shaped by said electric field;
   a sensor at the focal plane of said flexible membrane reflector for measuring the optical image quality of said reflector; and
   means responsive to said sensor for controlling selected portions of said electric field for altering the shape of corresponding selected portions of said optical surface to counteract passive and dynamic perturbations in said surface.

13. The controlled flexible membrane reflector of claim 12 wherein said means for controlling selected portions of said electric field includes a processor responsive to the output of said image quality sensor and a plurality of control voltage sources connected to respective electrostatic control elements for applying signals thereto responsive to the output of said processor.

* * * * *